United States Patent Office 3,374,082
Patented Mar. 19, 1968

3,374,082
HERBICIDAL METHODS AND COMPOSITIONS COMPRISING 2-AMINO AND LOWER ALKANOAMIDO-5-HALOTHIAZOLES
Alan J. Lemin, Richland Township, Kalamazoo County, Mich., assignor to The Upjohn Company, Kalamazoo, Mich., a corporation of Delaware
No Drawing. Filed Jan. 25, 1965, Ser. No. 427,918
13 Claims. (Cl. 71—90)

ABSTRACT OF THE DISCLOSURE

It has been discovered that certain 5-halo-2-amino (or alkanoamido) thiazoles are effective herbicides. Some of the compounds are old, but some, e.g., N-(5-chloro-2-thiazolyl)propionamide are new and especially effective herbicides. The compounds are prepared by halogenating a 2-amino-thiazole or a 2-alkanoamidothiazole according to known methods. The compounds are effective against crabgrass, wild oats, quackgrass, bindweed, lambsquarters, pigweed, and other weeds. New compositions for the control of weeds are described.

---

This invention pertains to a method, and compositions for practicing the method; more particularly, a method for controlling weeds, and herbicidal compositions comprising a 5-halo-2-amino(or alkanoamido)thiazole of the following structural formula:

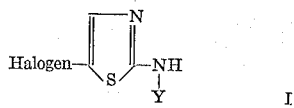

wherein Y is selected from the group consisting of hydrogen and lower-alkanoyl of from 1 to 6 carbon atoms, inclusive.

The 5-bromo-, 5-chloro-, and 5-iodo-2-aminothiazoles according to Formula I are known compounds; and the 5-bromo-, 5-chloro-, and 5-iodo-2-acetamidothiazoles according to Formula I are known compounds. Other 5-halo-2-alkanoamidothiazoles according to Formula I are prepared by halogenating a 2-alkanoamidothiazole. Several methods of halogenation are described in the literature. For example, E. Pedley, J. Chem. Soc., 1947, p. 431, describes chlorination of 2-acetamidothiazole with sulfuryl chloride in carbon disulfide; similarly, K. A. Jensen and O. R. Hansen, Dansk. Tids. Farm., 20, pp. 226–230 (1946), describe bromination of 2-acetamidothiazole with bromine in glacial acetic acid. Likewise, Paulo C. Ferreira, Ciencia 10, pp. 139–141 (1950) describes the preparation of 5-iodo-2-acetamidothiazole from 5-chloromercuri-2-acetamidothiazole using iodine and potassium iodide in aqueous mixture.

The 2-alkanoamidothiazoles are prepared by acylating 2-aminothiazole with an acid halide or an anhydride of a lower-alkanoic acid. When acylation is effected with a lower-alkanoic acid halide an acid acceptor is used to take up the hydrogen halide formed during the reaction. Illustrative acid acceptors include triethylamine, pyridine, picoline, and the like. Representative lower-alkanoic acid halides are acetyl chloride, acetyl bromide, propionyl chloride, butyryl chloride, isobutyryl chloride, pentanoyl chloride, hexanoyl chloride, and 4-methylpentanoyl chloride.

When acylation is effected with a lower-alkanoic anhydride, no acid acceptor is included in the reaction mixture. An acylation catalyst can be used, e.g., sulfuric acid, p-toluenesulfonic acid, boron trifluoride, and perchloric acid. The rate of acylation is increased by heating and stirring the reaction mixture. Acetic anhydride, formic acetic anhydride, propionic anhydride, butyric anhydride, isobutyric anhydride, pentanoic anhydride, hexanoic anhydride, 4-methylpentanoic anhydride, and like anhydrides can be used. The amide can be recovered by pouring the reaction mixture into cold water, isolating the precipitated crude product, washing, and if desired, further purifying by conventional procedures such as recrystallization.

In accordance with the above described methods of halogenation and acylation, the following representative 5-halo-2-alkanoamidothiazoles have been prepared and have been found to possess herbicidal activity: N-(5-chloro-2-thiazolyl)-propionamide; N - (5-bromo-2-thiazolyl)propionamide; N-(5-chloro-2-thiazolyl)butyramide; and N-(5-bromo-2-thiazolyl)butyramide. The newly discovered herbicidal activity of 5-halo-2-alkanoamidothiazoles provides a means of preventing damage to field crops by weed competition. It also provides a means of preventing unsightly growth of weeds on home lawns, golf courses, cemeteries, railroad right-of-ways, and public commons.

For purposes according to the method of this invention, compounds of Formula I are formulated in herbicidal compositions. Such compositions in accordance with the invention include solutions, emulsions, suspensions, dispersible powders, emulsifiable concentrates, granular formulations, and dusts. All of these compositions comprise the 5-halo-2-aminothiazole or 5-halo-2-alkanoamidothiazole in dispersed or readily dispersible form and a carrier, with or without adjuvants. In general, selective inhibition of undesired weed species in the presence of field crops or in turf is obtained by employing a phytonomic carrier, that is to say, a carrier which can be applied to plants without phytotoxicity or other adverse effects. On the other hand, when general herbicidal activity is desired a phytotoxic carrier, for example, high-boiling mineral oil fractions or chlorohydrocarbons can be used.

The efficacy of 5-halo-2-aminothiazoles and 5-halo-2-alkanoamidothiazoles as herbicides is of high order, and the compounds can be applied at relatively low rates per acre for preventing germination of seeds and controlling growth of plants. Illustratively, 2-acetamido-5-bromothiazole, N-(5-chloro-2-thiazolyl)propionamide, N - (5-chloro-2-thiazolyl)-butyramide, and N-(5-bromo-2-thiazolyl)butyramide gave complete or substantially complete suppression of crabgrass, wild oats, quackgrass, bindweed, lambsquarters, and pigweed, when applied at rates of about 1 to 8 lbs. per acre. Little or no phytotoxic effect is apparent among field crop plants such as corn and soybeans at these and even somewhat higher rates of application. At high rates of application, e.g., at 20 to 50 lbs. per acre the compounds are phytotoxic to most weeds as well as crops. Illustratively, excellent control of weeds in cornfields has been obtained, without damage to the corn plants, using concentrations of N-(5-bromo-2-thiazolyl)propionamide ranging from 156 p.p.m. (parts per million) to 1250 p.p.m. applied at the rates of 1.25 to 5 lbs. per acre. In general, a desired rate of application can be achieved by distributing, over the area to be treated, an aqueous composition in accordance with the invention, containing from about 700 p.p.m. to about 30,000 p.p.m. of active ingredient. It will be understood, of course, that a choice of concentration of active ingredient depends upon the method of application as well as the type of composition and the degree of herbicidal control desired. In general, concentration is not critical within the range indicated since an effective quantity of active ingredient can be applied to a given area by applying greater quantities of a low concentration than of a higher concentration. The concentration of active ingredient in the dispersible powder and emulsifiable concentrates from which the aqueous compositions are prepared can be as high as 99.5% by weight. The concentration of active ingredient in the dust and granular formulations of the invention can vary from about 0.25% to about 80% or more, but advantageously is of the order of 0.50% to 20%.

The granular formulations of this invention are prepared with about 0.25% to about 80%, preferably 0.50% to 20% by weight, of active ingredient and a granular carrier, for example, vermiculite, pyrophyllite, and attapulgite. The active ingredient can be dissolved in a volatile solvent such as methylene chloride, acetone, and the like, and sprayed on the granular carrier as it is mixed and tumbled. The granules are then dried. The granular carrier can range in particle size from about 10 to about 60 mesh, preferably about 30 to 60 mesh.

The herbicidal dust compositions of the invention are prepared by intimate admixture of from about 0.25% to about 80% by weight, preferably 0.50% to 20% of the active ingredient with a solid pulverulent carrier which maintains the composition in a dry, free-flowing state. Since the 5-halo-2-aminothiazoles and 5-halo-2-alkanoamidothiazoles are solids at ordinary temperatures, the herbicidal dusts of the invention can be prepared by admixing with a solid diluent and then milling. Preferably, however, the active ingredient is dissolved in a volatile organic solvent, of the kinds indicated above, and then sprayed on the solid carrier so as to assure thorough distribution. The mixture is then dried and milled to the desired size, e.g., less than about 60 microns.

Solid carriers that can be used in the dust compositions of the invention include the natural clays such as China clay and bentonite, minerals in the natural state such as talc, pyrophyllite, quartz, diatomaceous earth, fuller's earth, chalk, and rock phosphate, and the chemically modified minerals such as washed bentonite, precipitated calcium phosphate, precipitated calcium carbonate, precipitated calcium silicate, and colloidal silica. The solid diluents which can be employed in the compositions also include solid, compounded fertilizers. Such solid compositions can be applied to vegetation in the form of dusts by the use of conventional machinery.

A preferred composition, in accordance with the invention, is a dispersible powder which is prepared by incorporating a surfactant in a dust composition prepared as described above. Such a dispersible powder can be dispersed in water to any desired concentration and applied to vegetation by conventional spray equipment. Conveniently, the dispersible powders are formulated with higher concentrations of active ingredient than the dust compositions, for example, up to about 90%, preferably about 10% to 80%. Surfactants useful in preparing such dispersible powder compositions include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. A preferred class of surfactants includes blends of sulfonated oils and polyalcohol carboxylic acid esters (Emcol H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredient which can be applied to soil, plant growth media, or turf at the rate of 40 gals. per acre to give a total application of active ingredient of 1 lb. per acre.

The compounds of this invention can be applied to soil, plant growth media, and turf in aqueous sprays without a solid carrier. However, since the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess 5-halo-2-aminothiazole or 5-halo-2-alkanoamidothiazole will be thrown out of solution. In an emulsion, the solvent phase is dispersed in the water phase and the active ingredient is held in solution in the dispersed phase. In this way, uniform distribution of active ingredient in an aqueous spray is achieved. A solvent carrier in which 5-halo-2-aminothiazoles or 5-halo-2-alkanoamidothiazoles are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing germination of undesired seeds and controlling growth of plants.

The emulsifiable concentrates of the invention are prepared by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed if desired.

Advantageously, the concentration of active ingredient in the emulsifiable concentrates can range from about 5% to about 50% by weight, preferably from about 10% to 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium lignosulfonate, and the like.

The rates of application to soils, plant growth media, or turf to be protected from noxious weeds will depend upon the species of vegetation to be controlled, the presence or absence of desirable species, the season of year at which treatment is undertaken, and the method and efficiency of application. In general, selective herbicidal activity is obtained when the compounds are applied at the rate of about 0.125 to about 15 lbs. per acre, preferably at the rate of about 2 to about 8 lbs. per acre.

The compositions containing 5-halo-2-aminothiazoles or 5-halo-2-alkanoamidothiazoles, according to the invention, can be applied to soil, plant growth media, and turf by conventional methods. For example, an area of soil can be treated prior to or after seeding by spraying wettable powder suspensions, emulsions, or solutions from boom-type power sprayers or from hand-operated knapsack sprayers. Dusts can be applied by power dusters, or by hand-operated dusters. Dusts and granular formulations can also be applied at the time of seeding in bands spanning the seeded rows.

The following examples are illustrative of the process and products of the present invention, but are not to be construed as limiting.

Example 1

A dispersible powder concentrate having the following percentage composition:

| | Percent |
|---|---|
| N-(5-bromo-2-thiazolyl)propionamide | 45.8 |
| Polymerized sodium salt of substituted benzoid long-chain sulfonic acid (Daxad 27) | 9.2 |
| Kaolinite | 45.0 | was prepared by mixing 250 g. of N-(5-bromo - 2 - thiazolyl)propionamide, 50 g. of a polymerized sodium salt of substituted benzoid long-chain sulfonic acid (Daxad 27), and 245 g. of kaolinite. The mixture was milled to a particle size averaging 5 to 30 microns. It was suspended in 10 gals. of water, giving an aqueous spray containing about 6500 parts per million of active ingredient.

The herbicidal efficacy of the formulation was then determined by spraying the composition at the rate of 2.5 lbs. per acre (active ingredient) on test plots of soil planted to rows of crabgrass, wild oats, quackgrass, bindweed, lambsquarters, sheeps sorrel, and corn. After 21 days the inhibition of weed seed germination and weed growth were noted, when compared with control plots of the same area and cultural treatment. The results are shown in Table I.

TABLE I

| Rate of application, active ingredients in 2.5 lbs./acre: | Percent inhibition |
|---|---|
| Corn | 0 |
| Crabgrass | 80 |
| Wild oats | 80 |
| Quackgrass | 75 |
| Bindweed | 85 |
| Lambsquarters | 85 |
| Sheeps sorrel | 85 |

In the same manner aqueous spray compositions containing 2-amino-5-chlorothiazole, 2-amino - 5 - bromothiazole, 2-amino-5-iodothiazole, 2-acetamido-5 - chlorothiazole, 2-formamido-5-chlorothiazole, 2 - acetamido - 5-bromothiazole, 2-acetamido-5-iodothiazole, N-(5-chloro-2-thiazolyl)propionamide, N-(5-bromo-2 - thiazolyl)butyramide, and N-(5-chloro-2-thiazolyl)butyramide were applied to weed seed infested soils. Similar herbicidal results were obtained.

Example 2

A fine granular formulation having the following percentage composition:

| | Percent |
|---|---|
| N-(5-bromo-2-thiazolyl)propionamide | 3.7 |
| Vermiculite (30/60 mesh) | 96.3 | was prepared by spraying a solution of 220 g. of N-(5-bromo-2-thiazolyl)propionamide in 1000 ml. of methylene chloride on 5780 g. of vermiculite (30 to 60 mesh) while the vermiculite was being tumbled and stirred so as to assure even distribution. The methylene chloride was then evaporated, leaving the N-(5-bromo-2-thiazolyl) propionamide adsorbed on the vermiculite, and the vermiculite was pulverized.

Example 3

An emulsifiable concentrate having the following percentage composition:

| | Percent |
|---|---|
| N-(5-chloro-2-thiazolyl)propionamide | 15.0 |
| Technical alkyl naphthalene boiling at 238° to 293° C. (Velsicol AR50) | 19.7 |
| Xylene | 17.4 |
| Isopropanol | 17.4 |
| Ethylene dichloride | 25.4 |
| Blend of alkyl aryl sulfonates and alkylphenoxy polyethoxy ethanols (Triton X–151) | 5.1 | was prepared by mixing 15.0 lbs. of N-(5-chloro-2-thiazolyl)propionamide, 19.7 lbs. of Velsicol AR50, 17.4 lbs. of xylene, 17.4 lbs. of isopropanol, 25.4 lbs. of ethylene dichloride, and 5.1 lbs. of Triton X–151.

6.67 lbs. of the concentrate mixed with 10 gals. of water gave a spray emulsion containing 11,000 p.p.m. of N-(5-chloro-2-thiazolyl)propionamide.

Example 4

An emulsifiable concentrate having the following percentage composition:

| | Percent |
|---|---|
| 2-acetamido-5-bromothiazole | 40.0 |
| Technical alkyl naphthalene boiling at 238° to 293° C. (Velsicol AR50) | 13.7 |
| Xylene | 12.3 |
| Isopropanol | 11.3 |
| Ethylene dichloride | 17.7 |
| Blend of alkyl aryl sulfonates and alkylphenoxy polyethoxy ethanols (Triton X–151) | 5.0 | was prepared by mixing 40.0 lbs. of 2-acetamido-5-bromothiazole, 13.7 lbs. of Velsicol AR50, 12.3 lbs. of xylene, 11.3 lbs. of isopropanol, 17.7 lbs. of ethylene dichloride, and 5.0 lbs. of Triton X–151.

1.67 lbs. of the concentrate mixed with 10 gals. of water gave a spray emulsion containing 8,000 p.p.m. of 2-acetamido-5-bromothiazole.

Example 5

A wettable powder concentrate having the following percentage composition:

| | Percent |
|---|---|
| 2-acetamido-5-chlorothiazole | 50 |
| Kaolinite clay (finely divided) | 46 |
| Sodium salt of condensed mononaphthalene sulfonic acid (Lomar D) | 4 | was prepared by mixing 50 g. of 2-acetamido-5-chlorothiazole, 46 g. of the kaolinite clay, and 4 g. of Lomar D.

The mixture was milled to an average particle size of 5 to 30 microns.

*Example 6*

A granular formulation having the following percentage composition:

|  | Percent |
|---|---|
| N-(5-chloro-2-thiazolyl)butyramide | 1 |
| Pyrophyllite (30/60 mesh) | 99 | was prepared by dissolving 1.0 lb. of N-(5-chloro-2-thiazolyl)butyramide in 10.0 lbs. of ethylene dichloride and spraying the solution on 99.0 lbs. of pyrophyllite. The granules were dried and then packaged for use.

I claim:
1. The method of preventing germination of seeds and controlling growth of plants which comprises applying to said seeds and said plants a herbicidally effective amount of a compound of the formula:

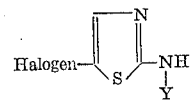

wherein the halogen is selected from the group consisting of chlorine, bromine and iodine and Y is selected from the group consisting of hydrogen and lower-alkanoyl of from 1 to 6 carbon atoms, inclusive.

2. The method of preventing germination of seeds and controlling growth of plants which comprises applying to said seeds and said plants from 1 to 50 lbs. per acre of a compound of the formula:

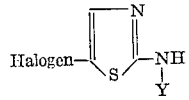

wherein the halogen is selected from the group consisting of chlorine, bromine and iodine and Y is selected from the group consisting of hydrogen and lower-alkanoyl of from 1 to 6 carbon atoms, inclusive.

3. The method of preventing germination of seeds and controlling growth of plants which comprises applying to said seeds and said plants from 1 to 50 lbs. per acre of 2-alkanoamido-5-bromothiazole wherein "alkanoamido" is of from 1 to 6 carbon atoms, inclusive.

4. The method of preventing germination of seeds and controlling growth of plants which comprises applying to said seeds and said plants from 1 to 50 lbs. per acre of 2-alkanoamido-5-chlorothiazole wherein "alkanoamido" is of from 1 to 6 carbon atoms, inclusive.

5. The method of claim 3 wherein N-(5-bromo-2-thiazolyl)propionamide is applied at the rate of 1 to 8 lbs. per acre.

6. The method of claim 3 wherein 2-acetamido-5-bromothiazole is applied at the rate of 1 to 8 lbs. per acre.

7. The method of claim 3 wherein N-(5-bromo-2-thiazolyl)butyramide is applied at the rate of 1 to 8 lbs. per acre.

8. The method of claim 4 wherein N-(5-chloro-2-thiazolyl)propionamide is applied at the rate of 1 to 8 lbs. per acre.

9. The method of claim 4 wherein 2-acetamido-5-chlorothiazole is applied at the rate of 1 to 8 lbs. per acre.

10. The method of claim 4 wherein N-(5-chloro-2-thiazolyl)butyramide is applied at the rate of 1 to 8 lbs. per acre.

11. Composition comprising a dispersible carrier, a surfactant, and as the essential active ingredient, a compound of the formula:

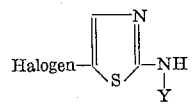

wherein the halogen is selected from the group consisting of chlorine, bromine and iodine and Y is selected from the group consisting of hydrogen and lower-alkanoyl of from 1 to 6 carbon atoms, inclusive.

12. The composition according to claim 11 wherein the dispersible carrier is a solid pulverulent carrier and the particle size of the composition is less than about 60 microns.

13. Emulsifiable concentrate comprising a substantially water-immiscible solvent carrier, a surfactant and from about 5% to about 50% of an essential active ingredient of the formula:

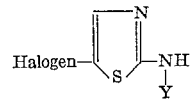

wherein the halogen is selected from the group consisting of chlorine, bromine and iodine and Y is selected from the group consisting of hydrogen and lower-alkanoyl of from 1 to 6 carbon atoms, inclusive.

References Cited

FOREIGN PATENTS 637,819   3/1964   Belgium.

OTHER REFERENCES

C.B.C.C. Positive Data Series, No. 2, National Academy of Sciences, National Research Council, June 1955, pp. b, c, and 43.

Pedley, J. Chem. Soc. 1947, 431.

LEWIS GOTTS, *Primary Examiner.*

M. M. KASSENOFF, *Assistant Examiner.*